United States Patent [19]

Vivirito

[11] 4,204,268
[45] May 20, 1980

[54] AUXILIARY COMMUTATION CIRCUIT FOR AN INVERTER

[75] Inventor: Joseph R. Vivirito, South Windsor, Conn.

[73] Assignee: United Technologies Corporation, Hartford, Conn.

[21] Appl. No.: 973,339

[22] Filed: Dec. 26, 1978

Related U.S. Application Data

[63] Continuation-in-part of Ser. No. 930,469, Aug. 2, 1978, abandoned.

[51] Int. Cl.$^2$ ............................................. H02M 7/515
[52] U.S. Cl. ...................................... 363/135; 363/57; 363/96; 363/139
[58] Field of Search ...................... 363/27, 57, 58, 96, 363/135–139

[56] References Cited

U.S. PATENT DOCUMENTS 3,249,844    5/1966    Jensen ................................. 363/139

Primary Examiner—William M. Shoop
Attorney, Agent, or Firm—Richard P. Lange

[57] ABSTRACT

An auxiliary commutation circuit to compensate for transient type overload conditions of an inverter comprises a pair of oppositely charged capacitors controlled by separate switches, each operable at a particular time during the conduction cycle of the main thyristors to provide additional stored energy for commutation during overcurrent conditions. A current detector senses the load current and provides a signal to an auxiliary gate whenever the rate of change in the load current or its absolute magnitude exceeds a preselected value. In response to the overcurrent signal and a timing signal, the auxiliary gate renders the appropriate switch operative coupling the charged auxiliary capacitor in parallel with the primary commutation capacitor so that the combined electrical energy stored on both capacitors is available for commutation. After the commutation period the auxiliary gate maintains the switch in its open state for a sufficient period of time to allow the auxiliary capacitor to be recharged.

10 Claims, 3 Drawing Figures

AUXILIARY COMMUTATION CIRCUIT FOR AN INVERTER

BACKGROUND OF THE INVENTION

This application is a continuation-in-part application of U.S. Ser. No. 930,469, filed Aug. 2, 1978, now abandoned.

FIELD OF THE INVENTION

This invention relates to inverters and, more particularly, to an auxiliary commutation circuit for assisting in the commutation of the main thyristors of an inverter during an overcurrent condition.

DESCRIPTION OF THE PRIOR ART

Inverters are known generally and are devices which transform DC (direct current) electrical energy, such as from a fuel cell or the like, into AC (alternating current) electrical energy suitable for use by utility companies or other consumers of electrical energy. Most inverters include at least one pair of main switching elements, and by alternatively actuating each switch, electrical energy from the DC source flows through the load first in one direction and then in the reverse direction forming a fundamental AC waveform.

Numerous different types of switching devices can be employed in an inverter to reverse the current through the load. Semiconductor switches, such as thyristors, are frequently used in present day inverters and this type of device is typically unidirectional so that the high energy current pulse passes in only one direction from the input terminal to the output terminal when turned on by a suitable signal applied to its control terminal of the semiconductor switch. Some semiconductor switches, as is known, will not immediately change from a conducting to a nonconducting state upon the removal of a control signal from the control terminal but require that the magnitude of the instantaneous current passing from the input terminal to the output terminal be reduced to zero whereupon the semiconductor switch turns off.

The process by which the current is reduced to zero through the semiconductor switch so that it can change from its conducting to its nonconducting state is known as "commutation" and numerous circuit configurations have been proposed for this function. Many commutation circuits operate by presenting a commutation pulse to the load from a storage device, such as a capacitor or resonant circuit, for a period of greater than the turn off time of the semiconductor switch. Since during this period the load current is supplied by the storage device of the commutation circuit, the magnitude of the current through the semiconductor switch drops to zero for a sufficient period to allow transition to the nonconducting state.

It is well known in the art that the amount of energy stored in the commutation capacitors is a function of the value or capacitance of such capacitors as well as the voltage impressed thereacross; however, the amount of stored energy required to commutate the main semiconductor switches is proportional to the magnitude of the current therethrough or the load current, i.e. the greater the magnitude of the load current the more stored energy required to commutate the semiconductor switches. Accordingly, the value of the commutation capacitor is often selected by ascertaining the highest value of load current which must be commutated and then sizing the commutation capacitor such that the necessary commutation pulse can be provided.

A disadvantage of the foregoing method of selection of a commutation capacitor size is that with a large commutation capacitor the no-load losses of the inverter are particularly high in that a commutation pulse having a capability for commutating the full load current is discharged from the storage device during each commutation cycle. In addition to a reduction in overall efficiency, this unnecessary current flow in the primary circuit causes instantaneous rises in the junction temperature and the magnitude of the thermal cycles of the semiconductor switches which both increases the likelihood of failure and also decreases the lifetime of the switching elements and also increases turn off time.

Also of particular interest is U.S. Pat. No. 3,249,844 issued May 3, 1966 to J. Jenson for SEMICONDUCTOR APPARATUS in which the load current of an inverter is sensed to control switching elements for introducing additional commutating capacitors as the load current demand increases. It is important to note that these auxiliary capacitors (items 30–32 in the drawing) are coupled into the inverter circuit in parallel with the continuously operating capacitor (item 27 of the drawing) when the auxiliary capacitors are in an uncharged state. This is significant because without stored energy in the auxiliary capacitor, the increased amount of energy required to extinguish a transient current through a thyristor is not available and the thyristor cannot be commutated to its off state. In fact, the introduction of an uncharged auxiliary capacitor into the commutation circuit at a time when a transient condition occurs can have a significant adverse effect in that the charge required by the auxiliary capacitor diminishes the commutation energy available for extinguishing the main thyristor.

Of general interest is U.S. Pat. No. 3,805,141 issued Apr. 16, 1974 to Pompa, Jr. et al, assigned to the same assignee as the present application, which discloses a commutation circuit for a bimodal inverter which ensures that the main SCR's are commutated during period of rapidly increasing load current. A single commutation capacitor (item 44) stores electrical energy therein a means is provided for the purpose of reducing the load current flowing through the main SCR's during the commutation period to that required for extinguishing the semiconductor switch. The time interval between the actuation of the auxiliary commutation circuit and the actuation of the main control rectifier is varied as a function of load in order to ensure that the commutation capacitor is adequately charged to provide a sufficient commutation pulse to decrease the main SCR current to zero. But at lower levels of load current the time interval between the actuation of the auxiliary commutation circuit and the actuation of the main control rectifier is increased so that the commutation capacitor does not store a significant amount of electrical energy greater than that required to extinguish the load current.

SUMMARY OF THE INVENTION

A primary object of the present invention is to provide an electrical power inverter with improved operating efficiency by providing additional commutation energy during transient type overcurrent conditions.

According to the present invention, a DC-to-AC power inverter has a commutation circuit which includes an auxiliary portion which is operative only during overcurrent conditions. This improves operating efficiency by limiting the amount of electrical energy stored and discharged during each commutation cycle to only that for commutating a normal load current, but still provides a sufficient amount of stored energy during conditions of excessively high rates of additional change in load current or high peak values of load current so that the commutation circuit has sufficient energy to allow transition of the semiconductor switching devices to their nonconducting state.

According to the present invention, a DC-to-AC power inverter is provided with a commutation circuit having a portion that operates continuously and an auxiliary commutation portion which is rendered operative during overcurrent conditions. A control system consisting of a current detector in the output of the inverter and an auxiliary gate circuit senses the output load current and couples one of a pair of additional commutation capacitors in parallel with the main commutation capacitor during the overcurrent condition.

Other objects, features and advantages of the present invention will become apparent in the light of the following detailed description of a preferred embodiment as illustrated in the accompanying drawings.

DESCRIPTION OF THE ILLUSTRATED EMBODIMENT

Figure 1:
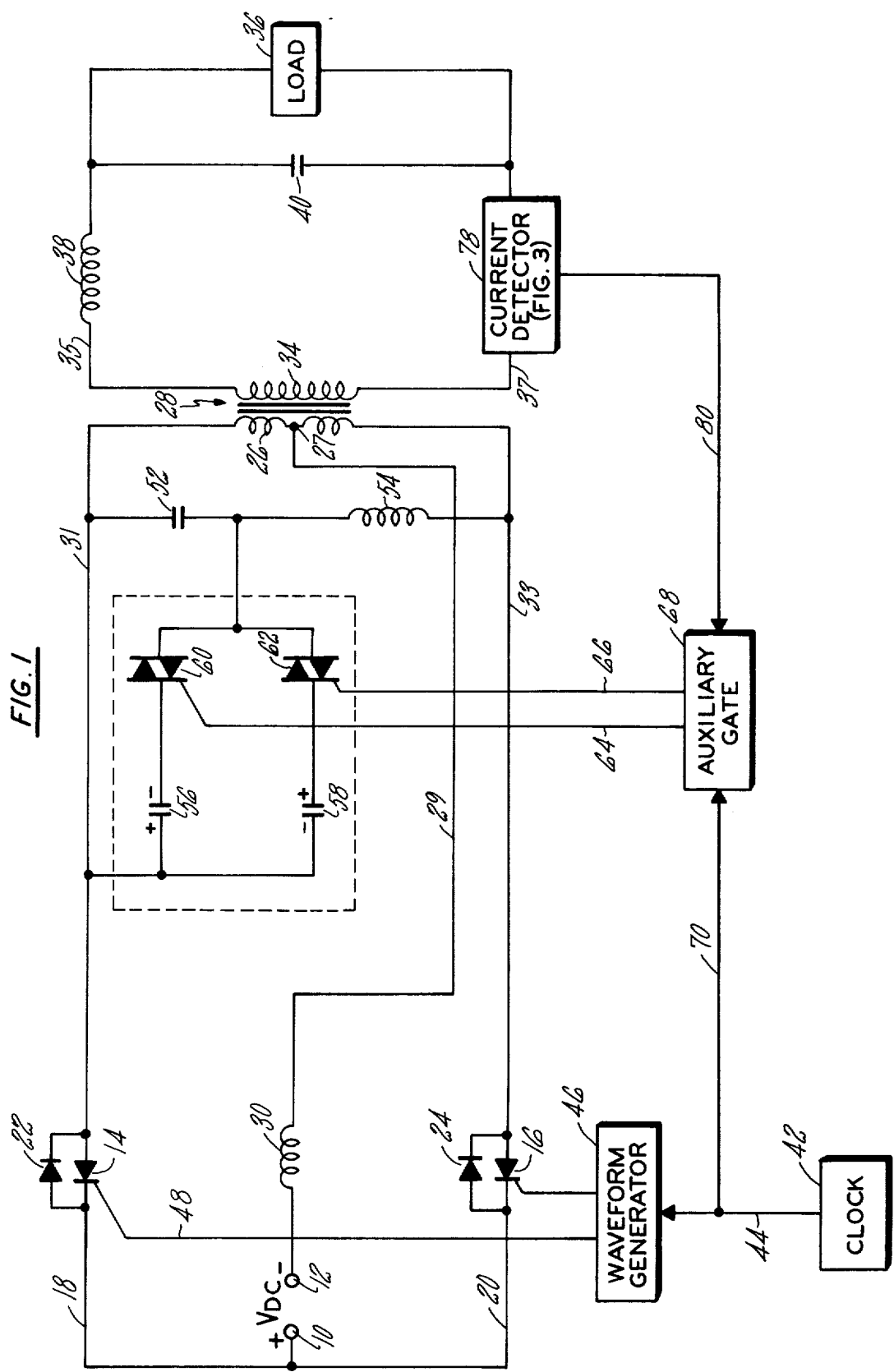
FIG. 1 is a block diagram of a circuit configuration according to the present invention illustrating a power inverter with a commutation circuit including the auxiliary commutation portion.

Referring initially to FIG. 1, one embodiment of a power inverter with a commutation circuit according to the present invention is illustrated. A negative input bus 10 and a positive input bus 12 receive DC electrical energy from an external source (not shown), such as a fuel cell or the like. A pair of semiconductor switches, such as thyristor 14 and thyristor 16, are provided, and each is connected to the negative input bus by lines 18 and 20, respectively, in a reverse polarity sense as will be described in greater detail hereinafter. A pair of commutation diodes 22 and 24 are connected across thyristors 14 and 16, respectively, which, in turn, are connected to opposite ends of the primary winding 26 of a transformer 28 by lines 31 and 38, respectively. The primary winding 26 includes a center tap 27 which is connected via lead 29 with inductor 30 and finally to the positive input bus 12. The transformer 28 includes a secondary winding 34 and it is connected by a lead 35 and a lead 37 to a load 36 which ultimately receives the AC electrical output power from the inverter. An output filter consisting of a series connected inductor 38 and a parallel connected capacitor 48 may be provided in the inverter output to reduce the harmonic waveforms in the output of the inverter.

A clock 42 is provided to create a basic timing signal for operation of the inverter and is connected via line 44 to a waveform generator 46. In turn, the waveform generator 46 generates a series of phase related pulses and, via lines 48 and 50, respectively, present the control waveform to the control terminals of the thyristors 14 and 16.

Still referring to FIG. 1, as indicated hereinbefore semiconductor switches, such as thyristors 14 and 16, change from their nonconducting state to their conducting state almost instantaneously in response to the application of a suitable control signal to their control terminal. However, in order to change such semiconductor switches from their conducting to their nonconducting state, the current therethrough must be reduced to approximately zero for a predetermined period of time before the SCR will turn off. This process is generally known as commutation and in the present invention is performed by a series resonant circuit. This series resonant circuit includes a capacitor 52 and an inductor 54 which is connected to lines 31 and 33 across the primary winding 26 of the transformer 28. According to the present invention, a commutation circuit for an inverter is provided with an auxiliary circuit to assist in commutating the semiconductor switches during periods of overcurrent conditions. This auxiliary circuit comprises a pair of capacitors 56 and 58, each connected in series with a switch, such as a triac 60 and a triac 62, respectively, and this combination is connected in parallel with the main commutation capacitor 52. The control elements of the triacs 60 and 62 are connected via line 64 and 66, respectively, to an auxiliary gate 66 so that each triac can be rendered conductive in response to a suitable control signal applied thereto. A timing signal is applied to the auxiliary gate 68 via a line 70 from the clock 42. A current detector 78 senses the load current in the output circuit and provides a signal along line 80 to the auxiliary gate which is related to both the rate of change of current in the output circuit and also to the maximum value of the output current as will be described in greater detail hereinafter.

A particular feature of the present invention is that the auxiliary capacitors 60 and 62 are maintained in a charged state, one negatively charged while the other is positively charged to supplement the energy stored on the main capacitor 52 during overcurrent conditions such as a transient current surge resulting from the switching of line capacitor banks or lighting strikes. Once in operation, the charge on each capacitor is maintained by leakage current which passes through the triacs 60 and 62 to refresh the peak magnitude of the stored energy.

Figure 2:
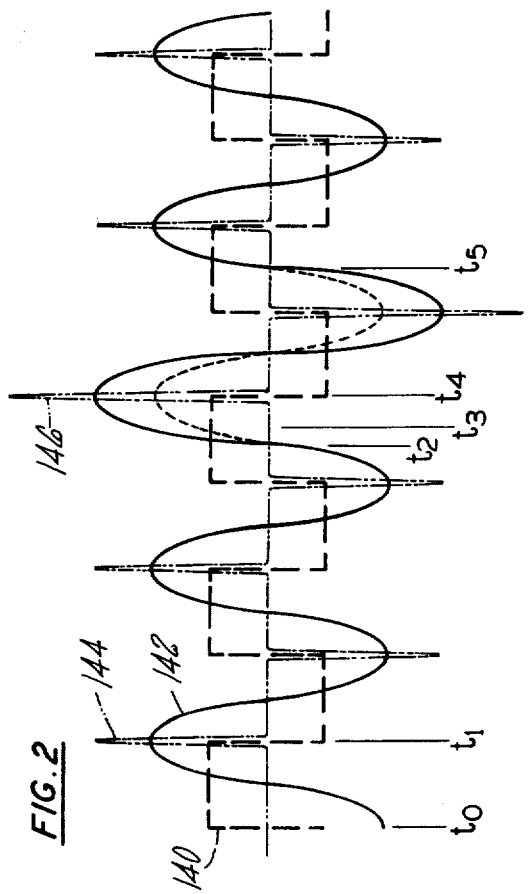
FIG. 2 is a graph illustrating the waveforms at various points in FIG. 1.

Referring now to FIG. 2, there is shown a circuit diagram of one embodiment of the current detector 78. As hereinbefore described, the current detector provides an output signal on lines 80 when the load current in the line 37 exceeds a predetermined maximum rate of change or absolute value. First considering the absolute value portion of the current detector, a current transformer 85 forms a signal proportional to the magnitude of the current in line 37 and presents it via line 86 to a full wave rectifier 88 which is in turn coupled by line 90 to a filter 92. Accordingly, the voltage level out of the filter 92 directly corresponds to the approximate peak or absolute value of the fundamental current waveform presented to the load 36. The signal level from the filter 92 is presented by a line 94 to one input of a comparator 96. The other input of comparator 96 receives a voltage level input from a potentiometer 98 which has a terminal 100 couple to a suitable source of reference potential. As will be apparent, the voltage level presented by potentiometer 98 to the comparator 96 is adjustable so that whenever the level of the signal on line 94 representing the load current exceed the preselected value from the potentiometer 98, a positive signal appears at the output of the comparator 96 on a line 102 indicating that the selected absolute value of load current has been exceeded.

As indicated hereinbefore, the current detector 78 also includes a means for sensing the rate of change of current to the load. This portion of the current detector 78 includes an inductor 104 coupled in series with the line 37 supplying current to the load while lines 106 and 108 are coupled to line 37 to sense the voltage on opposite sides of the inductor 104 and present it to the inputs of a comparator 110. As is known, the voltage across an inductor is proportional to the rate of change of current through the inductor so that the signal level presented to the line 112 connected to the output of the comparator 110 represents the rate of change in load current. The signal from the comparator 110 is presented to an absolute value circuit 114 so that irregardless of whether the rate of changing load current is positive or negative, a signal level reflecting the rate at which the current is changing is presented via line 116 to an input of the comparator 118. The other input of the comparator 118 receives a voltage input from a potentiometer 120 which has a terminal 122 coupled to a suitable source of reference potential. As before, the voltage level presented by the potentiometer 120 to the comparator 118 is adjustable so that whenever the voltage level on line 116, a signal proportional to the absolute value of the rate of change of load current, the preselected value from the potentiometer 120, a positive signal appeared at the output of the comparator 118 on line 124.

It should be understood that while in the present invention a separate inductor, inductor 104, is employed as a part of the current detector 78, any other inductor in the output of the inverter, such as inductor 38 in the output filter, could perform the function of inductor 104.

In order that the current detector responds to either preselected overcurrent condition, the signal on line 124 and the signal on line 102 are presented to the inputs of an OR gate 126 which creates an output signal on line 80 whenever either of the overcurrent conditions exists separately, or if both overcurrent conditions exist simultaneously. Thus, it will be appreciated that a signal is presented on line 80 to the auxiliary gate circuit 68 for actuation of the auxiliary commutation circuit whenever the rate of change of load current or the absolute magnitude of the load currents exceed the preselected value from its respective potentiometer.

Figure 3:
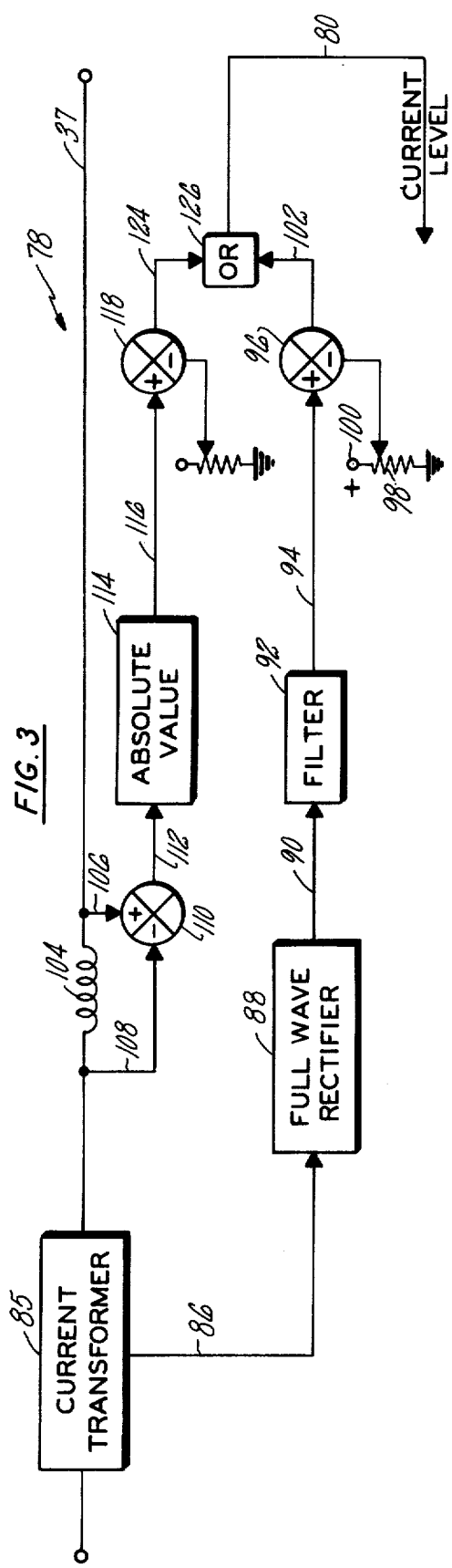
FIG. 3 is a circuit diagram of one embodiment of the current detector shown in FIG. 1.

In order to appreciate the present invention, the operation of an inverter employing the auxiliary commutation circuit will now be described. Referring to FIG. 3, the drawing depicts certain waveforms in the schematic circuit diagram of FIG. 1. Waveform 140 illustrates the voltage waveform appearing across the lines 31 and 33 and, as is seen, it is approximately a square wave. As is known, the current flowing through the lines 31 and 33 in response to this square wave is a complex waveform comprised of a fundamental component and a multitude of harmonic components which might be described by a Fourier series; however, for the purposes of this description only the fundamental component of the current to the load, waveform 142, is illustrated in the drawing. In addition, as is well known to those of ordinary skill, the phase relationship of the load current with respect to the waveform 140 is a function of the reactive impedance of the load; but, for the purposes of illustration, the worse case condition is shown in which the fundamental is 90° out-of-phase with the voltage waveform. At the time $t_0$, the thyristor 14 has been turned on by a signal applied to its control terminal from waveform generator 46. At the same time the other solid state switching element, thyristor 16, has been commutated to its nonconducting state and the fundamental component of the primary flow of current is reversing. The thyristor 14 remains in its conducting state and the current waveform 142 builds in the positive direction. Capacitor 52 which is connected to the line 31 is now charged negatively. At time $t_1$, a gating signal from the waveform generator 46 is presented to the control terminal of the thyristor 16 turning it on and the positive potential on the main commutation capacitor 52 rapidly discharges forming a short duration pulse, waveform 144, of current through inductor 54, thyristor 16, diode 22 and back to capacitor 52 charging the main commutation capacitor 52 in the reverse direction so that it can commutate the thyristor 16 at the appropriate time. This current pulse 144 decreases the current through the thyristor 14 for a sufficient period of time to allow it to switch to its nonconducting state. Now, with only the thyristor 16 in its conducting state, the magnitude of the fundamental of the load current builds in the reverse direction. The foregoing cyclic operation of such a complementary commutated inverter as shown with the present invention is well known to those of ordinary skill in the art and is not part of the concept on which the present invention is based. In the just preceding description, the main commutation capacitor 52 is sized to create a current pulse, waveform 144, for commutating the maximum rated load current through the main semiconductor switches; but, in the event of an overcurrent condition, the commutation pulse, waveform 144, could be insufficient to commutate the main semiconductor pulse. Now referring still to FIG. 3 in conjunction with FIG. 1, the operation of the auxiliary commutation circuit according to the present invention will be described. Presume that just prior to time $t_3$ in FIG. 3 an overcurrent condition occurs causing a current surge in the inverter into the load 36. At time $t_3$ the load current, waveform 142, exceeds the preselected current condition set in the current detector 78 and a signal indicating the same is presented to the line 80 and the auxiliary gate circuit 68. In response to the timing signal on line 70 and the signal indicating an overcurrent on line 80, the auxiliary gate circuit 68 selects the appropriate one of the pair of oppositely charged capacitors and presents a gating signal on line 66 to turn on the triac 62. The capacitor 58, already having its negatively charged size connected to the line 28 is now coupled in parallel with the capacitor 52 so that the combined energy available for commutation is now a function of the capacitance and voltage of both the capacitors 52 and 58. At the normal commutation time, $t_4$, the surge through the load 36 has caused the effective magnitude of the load current to exceed that which the charged capacitor 52 alone could commutate. However, because the triac 62 is turned on, the combined stored electrical energy for commutation is the sum of that on both the capacitors 52 and 58 which creates a larger commutation pulse 146 which is suitable for gating the thyristor 14 to its nonconducting state. The auxiliary gate circuit maintains the triac 62 in its conducting state for approximately 360 electrical degrees, $t_5$ in the drawing, so that the side of capacitor 58 connected to the line 31 will be charged negatively in the event of another overcurrent condition. In the event that the overcurrent condition exists during the negative going portion of the cycle with the thyristor 16 in its conducting state, the capacitor 56 which is appropriately charged for the commutation of the thyristor 16, would be employed in parallel with the capacitor 52 for commutation, and the operation of the auxiliary commutation circuit would then be similar to that just described.

It should be understood that the auxiliary commutation circuit can be used for a period of much longer than one cycle of the load current. For example, if an overcurrent condition still exists at time $t_5$, the auxiliary gate 68 maintains the bias signal on the control terminal of the triac 62 so that the capacitor 58 is coupled in parallel with the capacitor 52 for another time period approximately corresponding to one electrical cycle. As should be apparent, once either of the charged capacitors is switched in parallel with the capacitor 52, it will continue in that state for one cycle or multiples thereof until the overcurrent condition no longer exists.

The invention has been described in conjunction with the illustrated embodiment, but it should be understood that numerous modification and changes to that particular illustrated embodiment are possible without departing from the ambit of the present invention. For example, an inverter with a high power output capability, such as would be used for commercial scale conversion of electrical energy, may well have a comprehensive control system which could include a microprocessor or digital control system that functions to control both the DC source and the inverter itself. In that case, the actuation of the main semiconductor switches may occur as the result of a complicated series of calculations performed by the microprocessor or digital control system on parameters derived from inverter and source sensors rather than by the periodic waveforms created by the clock 42 and waveform generator 46 combination. Additionally, such a logic circuitry could also function in place of the auxiliary gate 68 to calculate the precise moment to switch the appropriate one of the charged capacitor in parallel with the main commutation capacitor 52. Furthermore, even the precise type of the inverter or its component parts need not be exactly as disclosed in the illustrated embodiment; thus, in addition to the disclosed type of inverter used with the illustrated embodiment generally known as an impulse commutated bridge inverter, the present invention could also be used with other bridge inverter designs having clamp-C or split-C commutation circuits, parallel inverters or series commutated inverters. Moreover, many different types of present day semiconductor switching elements could be used in place of either the thyristor 14 and 16 or the triac 60 and 62 so long as their characteristics were suitably matched with the remaining components of the inverter.

The above embodiment is to be considered in all respects as merely illustrative and not restrictive. The scope of the invention is to be determined by the appended claims rather than by the foregoing description. It is intended that all changes in constructions which would come within the meaning and range of the equivalency of the claims are to be embraced therein.

Having thus described typical embodiments of our invention, that which we claim as new and desire to secure by Letters Patent of the United States is:

1. An inverter for converting DC electrical energy into an output waveform having a substantially sinusoidal fundamental component, comprising:
   an input means for receiving electrical energy from a DC source;
   semiconductor switch means coupled to said input means, including a means for providing a control waveform of a frequency related to said fundamental sinusoidal component to said semiconductor switch means for periodically translating said switch means between its nonconducting and its conducting states;
   main commutation means connected to said semiconductor switch means which stores electrical energy for commutating the semiconductor switch means to its nonconducting state; and
   auxiliary means including a pair of capacitors on which electrical energy is stored during inverter operation, and which is operable in response to an overcurrent condition for providing additional electrical energy for commutation.

2. An inverter according to claim 2, wherein each of said pair of capacitors is controlled by a selectively activatable switch means, wherein said predetermined one of said capacitors is connected in parallel with said primary commutating capacitor in the commutation sequence to provide additional electrical energy for commutation.

3. An inverter according to claim 2, wherein said switch means of said auxiliary means is a semiconductor switch, and wherein an auxiliary gate is connected to the control terminal of each semiconductor switch for the activation thereof, and wherein said auxiliary gate receives a signal indicating an overcurrent condition and a timing signal so that depending on the phase relationship therebetween said auxiliary gate provides a suitable signal for activating one of said semiconductor switches.

4. An inverter according to claim 3, further including a current detector coupled in the output path of said inverter for sensing the output load current and providing a signal to said auxiliary gate if the characteristics of said load current exceeds a selected value.

5. An inverter according to claim 4, wherein said current detector includes a first portion which senses and compares the peak value of said load current with a preselected value, and a second part which senses and compares the rate of change of load current with a preselected value, and a digital means responsive to either said first portion or said second portion to provide an output signal indicating an overcurrent condition.

6. A commutation circuit for use with an inverter having a pair of semiconductor switches which are periodically actuated to convert DC electrical energy into an output wave-form having a substantially sinusoidal fundamental component, comprising:
   main commutation means having a resonant circuit including a capacitor for storing energy to commutate said pair of semiconductor switches;
   auxiliary commutation means including a pair of capacitors which are maintained unidirectionally charged during inverter operation, the charged polarity on one of said pair of capacitors being opposite of that on the other capacitor; and
   control means for selecting the appropriate one of said pair of charged capacitors for connection in parallel with said capacitor in said main commutation means in response to an overcurrent condition.

7. An inverter according to claim 6, wherein a selectively activatable switch means is connected in series with each of said pair of capacitors, the combination of which is connected across the capacitor in main commutation means.

8. An inverter according to claim 6, wherein said switch means of said auxiliary means is a semiconductor switch and wherein said auxiliary gate means is connected to the control terminal of each semiconductor switch for activation thereof, and wherein said auxiliary gate means receives a signal indicating an overcurrent condition and a timing signal so that depending on the phase relationship therebetween, said gate signal provides a suitable signal for activating one of said semiconductor switches.

9. An inverter according to claim 8, further including a current detector coupled in the output path of said inverter for sensing the output load current and providing a signal to the auxiliary gate if the load current exceeds a preselected value.

10. An inverter according to claim 9, wherein said current detector includes a first portion which senses and compares the peak value of said load current with a preselected value, and a second part which senses and compares the rate of change of load current with a preselected value, and a digital means responsive to either said first portion or said second portion to provide an output signal indicating an overcurrent condition.

* * * * *